H. L. SHALER.
Manufacture of Augers.

No. 203,079.      Patented April 30, 1878.

WITNESSES
Saml R Turner
E. D. Lowring

By

INVENTORS
Henry L. Shaler,
per: Chas H Fowler,
Attorney

UNITED STATES PATENT OFFICE.

HENRY L. SHALER, OF DEEP RIVER, CONNECTICUT.

IMPROVEMENT IN THE MANUFACTURE OF AUGERS.

Specification forming part of Letters Patent No. 203,079, dated April 30, 1878; application filed April 13, 1878.

*To all whom it may concern:*

Be it known that I, HENRY L. SHALER, of Deep River, in the county of Middlesex and State of Connecticut, have invented certain new and useful Improvements in Methods of Manufacturing Spur Auger-Bits; and I do hereby declare that the following is a full, clear, and exact description of my invention, which will enable others skilled in the art to which it appertains to make and use the same, reference being had to the accompanying drawings, and to letters of reference marked thereon, which form a part of this specification.

This invention relates to the method of manufacturing spur auger-bits; and has for its object to facilitate the forming of the screw-threads upon the worm or point without danger of injury to the spurs or cutting-edges thereof, as will be hereinafter described.

Figure 1:
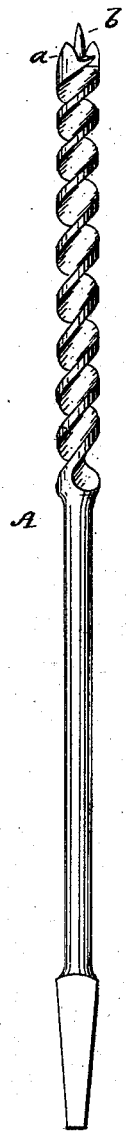

In the accompanying drawings, Figure 1 illustrates a spur auger-bit previous to the forming of the screw-threads upon the worm or point. The metal in the auger-bit at this stage of manufacture is in an annealed state, and consequently quite soft, the metal being easily bent or manipulated.

Figure 2:
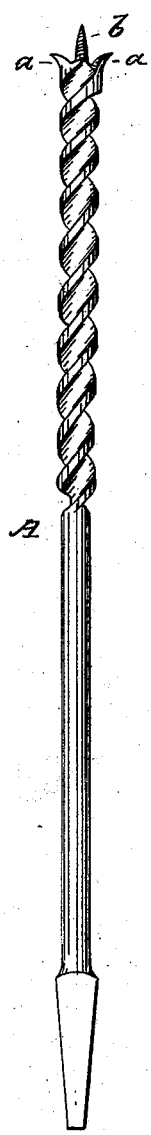

My improvement consists, previous to forming the screw-threads upon the worm, in bending outward while in this annealed state, or by heating, if desired, the spurs *a* of the auger-bit A, or that portion of the metal on the head of the auger-bit which is to be shaped into the spur. After that portion of the metal which is to form the spurs is thus bent, the screw-threads are formed, in the usual manner, upon or around the worm or point *b*, as illustrated in Fig. 2 of the drawings.

By this means it will readily be seen that the spurs cannot be damaged during the process of forming the screw-threads, which was regarded difficult in the manufacture of spur auger-bits of the smaller size, as the spurs were frequently injured to such an extent as to render them wholly worthless.

By bending outward the metal from which the spurs are formed the work in the manufacture of the bit is greatly facilitated, as well as the care and skill of cutting the threads upon the worm or point lessened, as it gives the workman better access with a file to the floor-lips around the worm where said worm joins them, so as to file that part of the bit-head to the proper shape, and do the work neatly and smoothly.

Figure 3:
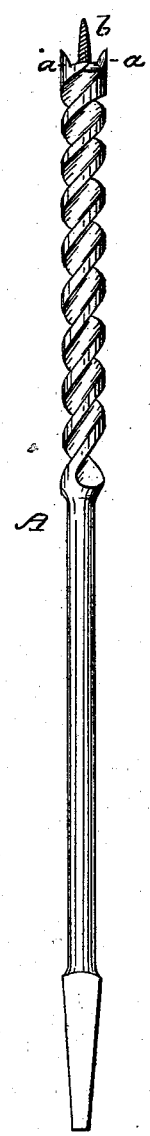

After the screw-threads are made on the worm and the work of filing before mentioned is done, the spurs *a* are bent to their proper place, and then sharpened, as shown in Fig. 3 of the drawing, after which the bit may be finished up in the usual manner.

Having now fully described my invention, what I claim as new, and desire to secure by Letters Patent, is—

The method of manufacturing spur auger-bits which consists in first bending outward the metal which is to form the spurs, and then forming the screw-threads on the worm, and afterward bending the metal from which the spurs are formed back to its proper place, and then finishing the bit in the usual manner.

In testimony that I claim the foregoing as my own I affix my signature in presence of two witnesses.

HENRY L. SHALER.

Witnesses:
JAMES A. JONES,
HENRY R. WOOSTER.